United States Patent
Kilian et al.

(10) Patent No.: US 7,597,976 B2
(45) Date of Patent: Oct. 6, 2009

(54) FLOATING BASE LOAD HYBRID STRATEGY FOR A HYBRID FUEL CELL VEHICLE TO INCREASE THE DURABILITY OF THE FUEL CELL SYSTEM

(75) Inventors: Peter Kilian, Heidelberg (DE); Volker Formanski, Wiesbaden (DE); Jochen Schaffnit, Darmstadt (DE)

(73) Assignee: GM Global Technology Operations, Inc., Detroit, MI (US)

( * ) Notice: Subject to any disclaimer, the term of this patent is extended or adjusted under 35 U.S.C. 154(b) by 434 days.

(21) Appl. No.: 11/313,162

(22) Filed: Dec. 20, 2005

(65) Prior Publication Data

US 2007/0141416 A1    Jun. 21, 2007

(51) Int. Cl.
*H01M 8/04* (2006.01)
(52) U.S. Cl. .................................................... 429/23
(58) Field of Classification Search .................... 429/23
See application file for complete search history.

(56) References Cited

U.S. PATENT DOCUMENTS

2005/0089729 A1*  4/2005  Jones et al. .................... 429/13

* cited by examiner

*Primary Examiner*—Patrick Ryan
*Assistant Examiner*—Thomas H. Parsons
(74) *Attorney, Agent, or Firm*—John A. Miller; Miller IP Group, PLC

(57) ABSTRACT

A fuel cell system employing a floating base load hybrid strategy for reducing fast voltage transients of a FCPM. A power request signal is applied to an average power calculation processor that calculates the average power requested over a predetermined previous period of time. A weighting function processor provides a weighting function based on the state of charge of an EESS. The power available from the FCPM and the EESS is applied to a power comparison processor. The available power is compared to the power request to provide a difference value between what is currently being provided and what is desired. The difference value is compared to power limit values of the EESS. The output value of this comparison is added to a filtered value to generate a signal for the change in the output power of the fuel cell stack based on the power request.

9 Claims, 1 Drawing Sheet

FLOATING BASE LOAD HYBRID STRATEGY FOR A HYBRID FUEL CELL VEHICLE TO INCREASE THE DURABILITY OF THE FUEL CELL SYSTEM

BACKGROUND OF THE INVENTION

1. Field of the Invention

This invention relates generally to a power system for a hybrid fuel cell vehicle and, more particularly, to a power system for a hybrid fuel cell vehicle that employs a floating base load strategy that reduces fast power transient demands from the fuel cell power module.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

Most fuel cell vehicles are hybrid vehicles that employ a rechargeable electrical energy storage system (EESS) in combination with the fuel cell stack, such as a DC battery or a super-capacitor. The EESS provides supplemental power for the various vehicle auxiliary loads, for system start-up and during high power demands when the fuel cell stack is unable to provide the desired power. More particularly, the fuel cell stack provides power to an electric traction system (ETS) and other vehicle systems through a DC voltage bus line for vehicle operation. The EESS provides supplemental power to the voltage bus line during those times when additional power is needed beyond what the stack can provide, such as during heavy acceleration. For example, the fuel cell stack may provide 70 kW of power. However, vehicle acceleration may require 100 kW or more of power. Therefore, the EESS would provide the extra 30 kW of power. The fuel cell stack is used to recharge the EESS during those times when the fuel cell stack is able to meet the system power demand. The generator power available from the ETS during regenerative braking is also used to recharge the EESS through the DC bus line.

As discussed above, the power demand from the ETS can be provided by the fuel cell stack, the EESS, or a combination of both. Normally, the EESS can provide energy faster than the fuel cell stack, and therefore can also increase the dynamic capabilities of the vehicle. Also, the fuel cell system can be made smaller and still provide the same driving capabilities, or the dynamic requirements of the fuel cell system can be reduced, which can increase durability.

For a typical hybrid vehicle strategy, the EESS is mainly used to increase efficiency, to lower the dynamic requirements of the fuel cell system, and/or to increase the performance of the vehicle. If the ETS demands more power, the EESS can provide the stored energy to the ETS very fast. Additional demanded power can be quickly provided by the fuel cell system.

The fuel cell system power demand for certain vehicle drive cycles may require that the fuel cell system operate in very different and fast changing power levels with high power gradients. These frequent changes in power may cause many voltage changes in the stack output power that reduces the lifetime and durability of the stack. In addition, fuel cell system components are highly stressed during hard power transients of the fuel cell stack. Therefore, a reduction of fast voltage changes will improve the durability of the fuel cell stack.

SUMMARY OF THE INVENTION

In accordance with the teachings of the present invention, a hybrid fuel cell system employing a floating base load strategy for reducing fast voltage transients of a fuel cell system is disclosed. The power request from an ETS is applied to an average power calculation processor that calculates the average power requested over a predetermined previous period of time. A state of charge signal is applied to a weighting function processor that provides a weighting function based on the current state of charge of an EESS. Particularly, the weighting function is a value that approaches zero as the state of charge of the EESS approaches its maximum. The weighting function and the average power calculation value are multiplied to generate a filtered base load demand to the fuel cell power system. The power available from the fuel cell stack and the power available from the EESS are applied to a power comparison processor. The combined currently available power from the stack and the EESS is compared to the request for the ETS to provide a difference value between what is currently being provided and what is desired. The difference value is added to the filtered value to generate a signal that changes the output power of the fuel cell stack for the current power request.

Additional features of the present invention will become apparent from the following description and appended claims, taken in conjunction with the accompanying drawings.

DETAILED DESCRIPTION OF THE EMBODIMENTS

Figure 1:
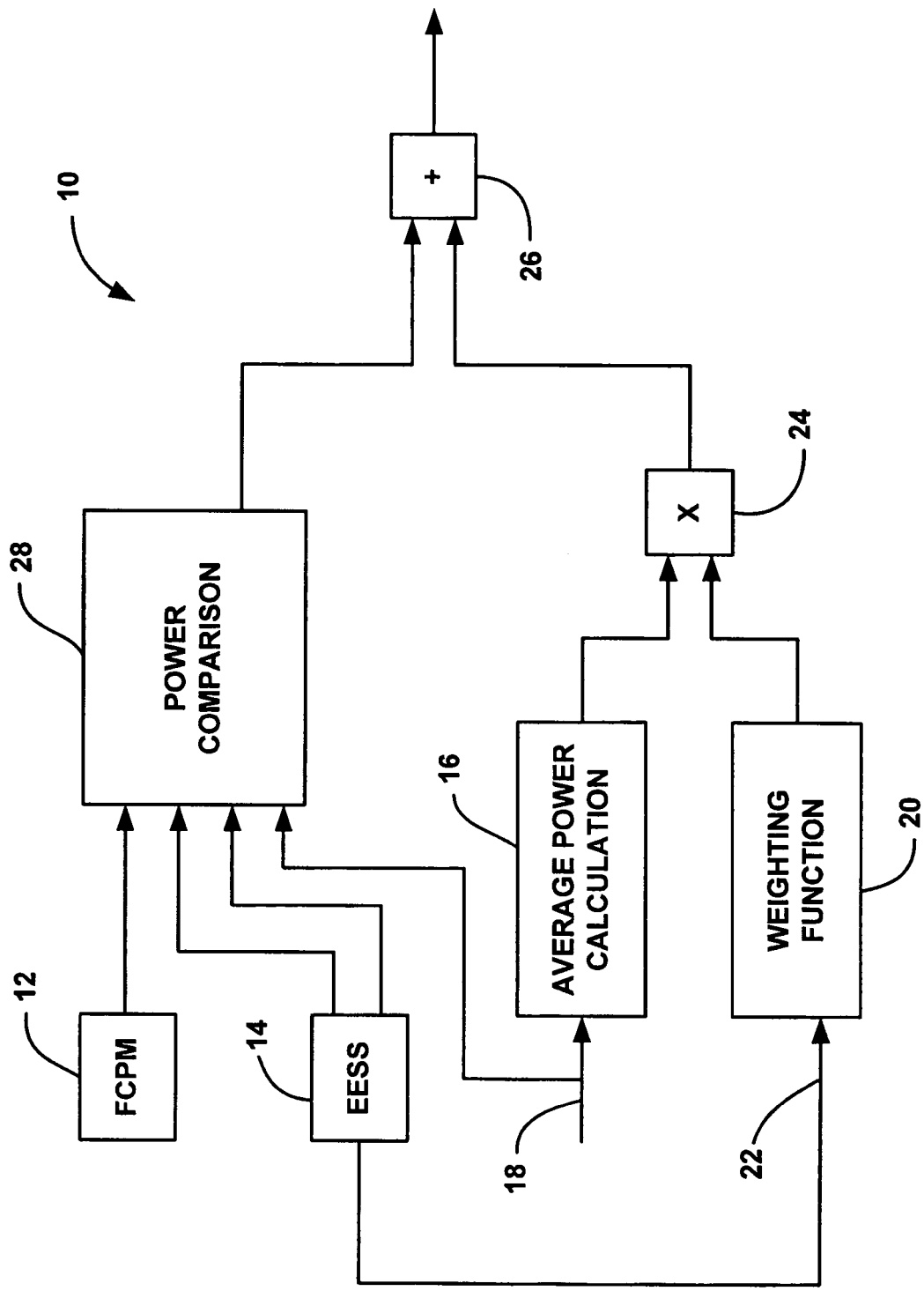
FIG. 1 is a block diagram of a power system for reducing fast voltage transients of a fuel cell power module, according to an embodiment of the present invention.

The following discussion of the embodiments of the invention directed to a power system for a hybrid fuel cell vehicle that reduces fast voltage transients is merely exemplary in nature, and is in no way intended to limit the invention or its applications or uses.

As will be discussed in detail below, the present invention provides a system and method for reducing fast voltage transients of the output power of a fuel cell stack in a hybrid fuel cell vehicle. The vehicle includes a hybrid power system having a fuel cell power module (FCPM) and an electrical energy storage system (EESS). The FCPM, the EESS, or both, can provide the required power to the ETS depending on the driver power command. The operation strategy of the invention determines the desired fuel cell system power by considering the actual power demand, an average power demand for a certain preceding time period, the actual EESS power limits and the state of charge of the EESS.

FIG. 1 is a block diagram of a power system 10 for a fuel cell electric hybrid vehicle, according to an embodiment of the present invention. The system 10 includes a FCPM 12 having a fuel cell stack, and an EESS 14, such as a DC battery, accumulator, super-capacitor or combination thereof, that provides supplemental power. An average power calculation processor 16 receives a power demand signal on line 18 representative of a power request for the ETS from the vehicle driver for a particular vehicle speed. The processor 16 calculates an average power demand over a preceding period of time, for example, a few seconds.

A signal of the current state of charge (SOC) of the EESS 14 is sent to a weighting function processor 20 on line 22. In one non-limiting embodiment, the weighting function has a minimum value of zero and a range that depends on predetermined battery parameters and the battery operation strategy. As the SOC of the EESS 14 approaches its maximum value, the weighting function is reduced to its minimum value so that the output power from the FCPM 12 used to recharge the EESS 14 is reduced. When the SOC of the EESS 14 is at its minimum value, then the weighting function is increased to its maximum value so that the output power from the FCPM 12 is increased to recharge the EESS 14. Thus, the weighting function changes the average power signal depending on the SOC of the EESS 14 so that the output power of the FCPM is high enough to satisfy the power demand and the charging requirements of the EESS 14.

The average power and the weighting function value based on the SOC of the EESS 14 are multiplied by a multiplier 24 to provide a filtered base load demand for the FCPM 12 that is averaged over a certain time period to reduce the fast voltage transients. The multiplied value is then sent to an adder 26.

The power being currently provided by the FCPM 12, the current power limits of the EESS 14, including both an available charge signal and an available discharge signal, and the power demanded from the ETS by the vehicle operator are provided to a power comparison processor 28. The processor 28 subtracts the power being currently provided by the FCPM 12 from the power demand signal on the line 18. This difference represents the power the EESS 14 has to provide. To ensure that the EESS 14 stays within its power limits, the difference signal is compared to the discharge or charge limit of the EESS 14, depending on the sign of the difference signal. Normally if the power difference stays within the power limits of the EESS 14, the output signal of the comparison processor 28 is zero. Thus, only the base load generated by the multiplier 24 commands the FCPM demand through the adder 26. If the power difference is not within the power limits of the EESS 14, additional or less power will be immediately demanded from the FCPM 12 by the comparison processor 28. The additional or less power is sent to the adder 26 to add it to the floating base load to generate a demand signal that changes the output power of the FCPM 12 to meet the driver demand. The actual EESS power limits (discharge and charge limit) provided to the comparison processor 28 can be dependent on the size of the EESS 14, current technology, the temperature of the EESS 14, SOC of the EESS 14, age, etc.

Based on the discussion above, if the power demand signal is lower than the actual FCPM power, the EESS 14 is charged by the FCPM 12 or by regenerative power of the ETS as long as the EESS 14 stays within its defined range. If the EESS 14 is not capable of taking the excess power from the FCPM 12 to be charged, the FCPM power is reduced as much as necessary to keep within the limit of the EESS 14.

If the power demand signal is higher than the actual FCPM power, the EESS 14 is discharged as long as the EESS 14 stays within its defined ranges (SOC, power, etc.). If the EESS 14 is not capable of delivering the additional power, the FCPM power is increased as much as necessary to keep the limit of the EESS 14 and to fulfill the power demand.

The system 10 allows the FCPM 12 to operate smoothly with a changing base load, i.e., a floating base load. Particularly, fast power transients of the output of the stack that may occur as a result of quick and frequent power demands from the vehicle operator are filtered by the average power calculation processor 16 so that these power demands are translated more smoothly to the FCPM 12. If the power demand signal is higher than the FCPM power, then the EESS 14 provides the additional power as long as the EESS 14 is within its bandwidth tolerance. If the EESS 14 is at its power limit, a higher power request is made to the FCPM 12.

The smooth power demand transitions provided by the system 10 can be described by way of example. Consider a fuel cell hybrid system that can provide 150 kW peak power to the ETS, where the maximum power from the FCPM 12 is 100 kW and the maximum power from the EESS 14 is 50 kW. At a certain operating point, the FCPM 12 is providing a base load of 20 kW. The power demand signal goes to 60 kW, and therefore the EESS 14 provides the remaining 40 kW. If the power demand signal increases to 120 kW, the EESS 14 has to provide its full power capacity of 50 kW and the FCPM 12 needs to provide 70 kW (50 kW plus the 20 kW base load).

The principle of the invention works as long as the EESS 14 stays within a certain bandwidth of its SOC. If the SOC decreases below a predetermined minimum value, the FCPM 12 needs to provide the requested power as long as the requested power is within the power capacity of the FCPM 12. If the power demand signal exceeds the maximum power available from the FCPM 12 when the SOC of the EESS 14 is below its predetermined minimum value, then the system 10 is unable to provide the requested power. It may be desirable in some systems to limit the maximum power to be equivalent to the maximum power available to the FCPM 12. Therefore, the ETS can be served at any time with the maximum acceleration power independent of the SOC of the EESS 14.

In addition, the base load can be controlled depending on the FCPM voltage. For example, a minimum FCPM power can be defined to avoid a certain upper voltage area, which is known as an operation mode with a strong durability reducing potential. A definition of such a minimum FCPM power or a maximum FCPM voltage is limited by different system and operation parameters, for example, the idle power consumption of the system 10, the energy capacity of the EESS 14, vehicle auxiliary, the drive cycle, etc.

One further option for the system of the invention is that a certain FCPM base load is already predefined for vehicle start-up. After start-up, the base load is determined as a function of the latest power request that changes the predefined FCPM base load. The time period, which is considered to determine the average power demands, can be adapted to the dynamic limitations of the EESS 14 and the FCPM 12 as well as to the vehicle performance requirements and the application of the hybrid power.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell power module including a fuel cell stack, said fuel cell power module providing a fuel cell power module signal indicative of the current output power of the module;
   an electrical storage device, said electrical storage device providing power limit signals indicative of the power limits of the device and a state of charge signal indicative of the current state of charge of the device; and
   a controller for reducing fast power transients of the output power of the fuel cell power module, said controller considering the actual power demand from the system, an average power demand for a predetermined previous period of time and the state of charge of the electrical storage device when reducing the fast power transients of the output power of the fuel cell power module so as to translate power demands more smoothly.

2. The system according to claim 1 wherein the controller weights the state of charge of the electrical storage device by a weighting function that decreases as the state of charge of the electrical storage device approaches its maximum state of charge and increases as the state of charge of the electrical storage device approaches its minimum state of charge.

3. The system according to claim 1 wherein the controller determines an output signal from the difference between the available power from the fuel cell power module and the demanded power by considering the power limit signal.

4. The system according to claim 1 wherein the electrical storage device is selected from the group consisting of a DC battery, an accumulator, a super-capacitor and combinations thereof.

5. The system according to claim 1 wherein the power limit signals from the electrical storage device include an available charge and an available discharge of the electrical storage device.

6. The system according to claim 1 wherein the predetermined previous period of time is a few seconds.

7. The system according to claim 1 wherein the fuel cell power module recharges the electrical storage device if the electrical storage device is not at a maximum state of charge.

8. The system according to claim 1 wherein the power demand signal comes from an electric traction system of a vehicle and other vehicle loads.

9. The system according to claim 1 wherein the controller defines a minimum fuel cell power module signal depending on the voltage of the fuel cell power module so as to avoid an upper voltage limit.

\* \* \* \* \*